July 13, 1954

C. R. REID 2,683,860

ARMATURE FAULT ANALYZER

Filed March 6, 1952

INVENTOR.
Carl R. Reid
BY Alfred J. Gross

ATTORNEY.

INVENTOR.
Carl R. Reid
BY Alfred T. Gross
ATTORNEY.

July 13, 1954  C. R. REID  2,683,860
ARMATURE FAULT ANALYZER
Filed March 6, 1952  4 Sheets-Sheet 3

INVENTOR.
Carl R. Reid
BY Alfred G. Gross
ATTORNEY.

July 13, 1954 C. R. REID 2,683,860
ARMATURE FAULT ANALYZER
Filed March 6, 1952 4 Sheets-Sheet 4

INVENTOR.
Carl R. Reid
BY Alfred H. Gross
ATTORNEY.

Patented July 13, 1954

2,683,860

UNITED STATES PATENT OFFICE 2,683,860

ARMATURE FAULT ANALYZER

Carl R. Reid, Akron, Ohio, assignor to The Hoover Company, North Canton, Ohio, a corporation of Ohio Application March 6, 1952, Serial No. 275,047

20 Claims. (Cl. 324—73)

My invention relates to an apparatus for subjecting armatures of electric motors to a test which will determine the existence of any one of a multitude of faults introdduced into armatures during the manufacturing process.

The subject matter of this application is related to the testing apparatus disclosed in my prior application, Serial No. 246,204 filed September 12, 1951, for Electrical Coil Testing Apparatus. The apparatus disclosed in the aforesaid application is particularly designed to detect the presence of a short circuit in the electrical system of the armature and it is preferable that an armature to be tested on the type of apparatus disclosed in the instant application be first tested to insure the absence of a short circuit.

In particular, it is an object of the present invention to provide a fault analyzing apparatus by which each individual coil of a motor armature is subjected to a test which will selectively indicate the existence of an open circuit, a deficient number of turns in any coil, a surplus number of turns in any coil or an incorrect connection of any coil and will perform the foregoing in a reliable manner requiring but a very small span of time to test a complete armature.

It is a further object of my present invention to provide a motor armature testing apparatus in which the armature to be tested is subjected to a standardized, high frequency magnetic field to induce high frequency voltage in the armature winding and in which the voltage level of the current induced in the armature is carefully measured and utilized to reveal the existence of particular types of faults and their location in the armature.

Other objects and advantages of the invention will become apparent as the description proceeds when taken in connection with the accompanying drawing, in which.

Figure 4:
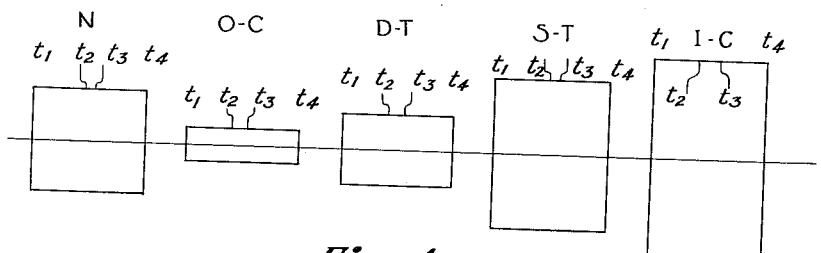
Figure 4 is a diagrammatic representation of voltage conditions existing between two adjacent commutator bars under normal and armature fault conditions.

Before describing my invention in detail, the general scheme of operation will be described with particular reference to Figures 4 and 5. In the present instance, it is assumed that an armature to be tested has previously passed a short circuit test and is normal in that particular. Even if the armature is free of short circuits, it may still fall into five distinct categories which are: acceptably normal, hereinafter designated as "N," open circuited, hereinafter designated as "O-C," having a number of turns in one coil below an acceptable minimum, hereinafter designated as "D-T," having a surplus number of turns in one coil over and above an acceptable maximum, hereinafter designated as "S-T," or having the connections to one armature coil reversed, hereinafter referred to as "I-C." As a practical matter, it is highly unlikely that a particular armature will be affected with more than a single one of the four fault conditions immediately above identified and the discussion herein assumes that no such conditions exist, but such remotely possible mutiple fault conditions do not result in the acceptance of a faulty armature as one fault will be detected.

In general, I propose to rotate the armature to be tested in a standard magnetic field which is energized by an audio-frequency current. For purposes of illustration herein, the armature will be assumed to have twenty-four commutator bars and twenty-four armature coils. The armature will be assumed to rotate at the rate of sixty R. P. M. or one revolution a second and the audio-frequency field will be assumed to have a frequency of twenty-four hundred cycles a second. An armature rotating in such a field will have voltage generated in the coils thereof proportional to the space position of the coil in question in reference to the magnetic axis of the field and roughly proportional to the number of turns in that coil. A pair of prods engage the commutator in position to contact adjacent commutator bars. The voltage between adjacent commutator bars, hereinafter referred to as the prod signal, will be proportional to the condition of the coil connected to such bars and will reflect the existence of any of the above mentioned types of deficiency or errors of manufacture. The figures of Figure 4 represent somewhat idealized prod signals produced by a normal armature and armatures having the above mentioned winding faults. Each prod signal block of Figure 4 is labelled in accordance with the type of armature coil which it represents. It is to be noted in this connection that the generally rectangular blocks of Figure 4, representing prod signals, are the envelopes of the prod signals as the voltage actually picked up by the prods is of the same frequency as the energizing field. It is also of importance in this connection to note that the shape of the envelopes of Figure 4 assumes absolutely perfect commutating condition and the complete absence of transient currents. The legends $t_1$ and $t_4$ in each case represent respectively the time at which both prods make contact with a pair of adjacent commutator bars and the time at which contact is lost with a pair of adjacent commutator bars. The time period $t_1$ to $t_4$ is hereinafter referred to as the "bar period." The time $t_4$ to $t_1$ during which the prods ride the commutator insulating segments is hereinafter called a "segment period." These time periods vary somewhat due to normal inaccuracies in production commutators and to imperfections in commutating action. Additionally, the value of the prod signal at and closely adjacent to the times represented as $t_1$ and $t_4$ in Figure 4 is invariably subject to unpredictable transient variations which are completely uninformative with respect to the condition of the particular coil to which connection is made. For this reason, most of the prod signal is discarded insofar as it is utilized for purposes of determining coil conditions. Only that portion thereof labelled "$t_2$ to $t_3$" is actually utilized, by means to be described hereinafter, for the purpose of determining coil conditions. During the short mid-bar period, represented by the time $t_2$ to $t_3$, transient conditions have disappeared, commutating conditions are steady, and the prod signal truly represents coil conditions.

The prod signal itself is unsuitable for direct interpretation and detection in terms of coil conditions. Consequently the signals, such as those represented by Figure 4, are fed to an electronic device herein referred to as a shaper, which acts in conjunction with a timing device to segregate the informative portion of the prod signal and to convert the same into a wave form which sharply differentiates various types of prod signals at the time $t_3$. The output of the shaper and timing facility is represented by the extreme right hand family of voltage wave forms of Figure 5, each of which is labelled to indicate the armature coil condition which it represents. The significant characteristic of this wave form is a very abrupt rise in voltage at the time $t_3$ followed by an exponential decay thereof, giving a roughly triangular wave form. It is also highly important to note that the acceptably normal voltage is a mid-value and that D-T and O-C conditions are less than normal. The S-T and I-C wave forms can be utilized directly to indicate their presence through voltage level sensitive circuits. This is not, however, possible with the D-T and O-C currents, as they are lower than the normal voltage. For this reason, the output of the shaper and timer facility is supplied to a pair of detecting devices which will in effect reject all but the D-T and O-C type signals and will then introduce a delay between the two in reference to time and convert the same into a form which can be utilized to energize suitable alarms. In addition to the foregoing general system, the apparatus includes an arrangement by which the existence of any one of the above identified faults immediately stops the apparatus and energizes a suitable indicating alarm which informs the operator of the type of fault which has been detected. Furthermore, the apparatus will, in general, locate the particular armature coil containing the fault which is indicated.

Figure 1:
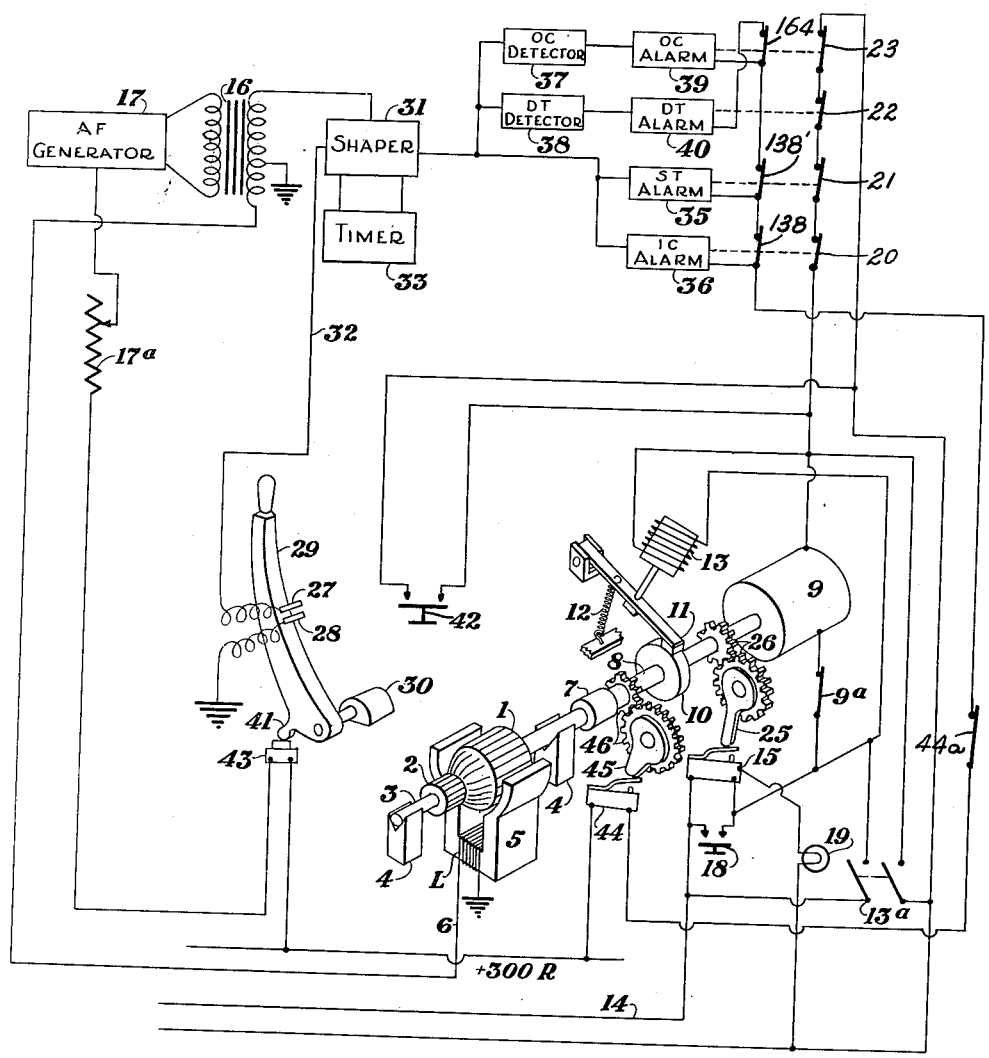
Figure 1 is a schematic representation of an apparatus embodying my invention.

Referring now to the drawing in detail and first to Figure 1 thereof, the reference character 1 indicates a test armature having the usual commutator 2. The shaft 3 of the armature is rotatably supported in bearing blocks 4 positioned on opposite sides of a standardized field structure 5 provided with an energizing coil L. The coil L connects to a conductor 6 extending to the secondary of a transformer 16, the primary of which is energized by an audio-frequency generator 17. The coils of the armature 1 are subjected to a high frequency field by the coil L which induces a voltage therein proportional to the intensity of the field, the instantaneous position of any particular coil in the field and the condition of the coil.

The motor shaft 3 is detachably engaged in a chuck 7 carried by an extended shaft 8 projecting from a combined drive motor and gear reduction mechanism 9. The shaft 8 also carries a brake drum 10 adapted to be engaged by a brake shoe 11 which is set by a spring 12. A solenoid 13 is arranged to release the brake 11 when the solenoid is energized.

One line of the power supply line 14 is connected to a single pole double throw cam switch 15 biased to close the circuit normally through one of the poles. The normally closed circuit pole of the cam switch 15 is connected to the solenoid 13 and to the drive motor 9 through a normally closed manual switch 9a. A normally open push-button switch 18 is bridged across the normally closed circuit contact of the switch 15 for the purpose of energizing the motor when the circuit through the switch 15 is interrupted. The normally open contact to the switch 15 is connected to an indicating lamp 19 which connects to the other supply line 14. As shown in Figure 1, the motor and brake solenoid 13 are parallel connected and are connected to the other side of the supply line 14 through four serially connected switches 20, 21, 22 and 23. Whenever a fault is detected in the test armature, in a manner to be described hereinafter, one of this group of switches is actuated to the open circuit position which de-energizes the motor and sets the brake to stop rotation of the armature. The solenoid 13 is also connected to the supply lines 14 by a normally open double pole switch 13a to energize the solenoid independently of other switching arrangements.

Rotation of the shaft 8 at sixty R. P. M. or one revolution per second has been found to be quite satisfactory for most commercial types of motor armatures. One complete revolution of the armature, requiring one second, is all that is required for a complete test thereof. It is, however, desirable to rotate the armature somewhat more than one revolution in order to insure steady state conditions during the actual testing period. For this reason, the present apparatus is disclosed as being set up to give the armature one and one half complete revolutions provided no fault is detected. For this purpose, a cam 25 is driven by gears 26 from the shaft 8 for actuating the cam switch 15 to de-energize the motor 9 and solenoid 13 and to energize the lamp 19. The gear ratio is such that the switch will be actuated after one and a half complete revolutions of the shaft 8. In starting the motor, the switch 18 is momentarily closed for a period of time sufficient to allow the cam 25 to clear the cam switch 15 after which the push button 18 may be released and the motor will continue rotating the armature for one and a half revolutions.

As each coil of the armature 1 moves into the position in which it is in maximum inductive relation to the field produced by the coil L, the commutator bars connected to such coil move into contact with a pair of commutator contacting prods 27 and 28 which are carried by a handle structure 29 pivotally supported upon a suitable standard 30. As shown in Figure 1, the handle 29 is in its raised position in which the prods 27 and 28 are removed from contact with the commutator 2. When the handle 29 is lowered, that is, rotated in a clockwise direction as viewed in Figure 1, the prods 27 and 28 will rest upon the commutator 2 to pick up currents induced in individual coils thereof. The spacing between the prods 27 and 28 is of importance in relation to the total span of two adjacent commutator bars, that is, those bars which are connected to the opposite ends of an individual coil in the armature 1. It is imperative that the prod spacing positively prevent the possibility of establishing contact with two non-adjacent commutator bars. On the other hand, it is desirable to space the prods sufficiently to give an appreciable time period in which the prods are contacting adjacent commutator bars. For this purpose, it has been found that an angular spacing of the bars equal to 360° divided by the number of commutator bars is a satisfactory spacing, though a somewhat wider or narrower spacing can usually be accommodated if desired. In any event, the angular displacement between the far edges of the two prods must not be greater than the minimum extent of a single commutator bar plus two insulating segments. In addition to the foregoing, the span of the prods should be slightly greater than the insulation span in the commutator under test to insure smooth riding of the prods from bar to bar as the armature is rotated but otherwise narrow to provide maximum time of smooth contact between the prods and each pair of commutator bars.

The signal induced in each armature coil as it comes into the position in which it is connected to the prods 27 and 28 is applied by the conductor 32 to a shaper unit 31 to which is connected a timer 33. The elements will be described in detail hereinafter. For the present, it is sufficient to note that the timer and shaper cooperate to reject all of the prod signal except that portion between the timer period labelled $t_2$ to $t_3$ in Figure 4. The signal occurring in this time period is truly proportional to the condition of the armature coil being tested. The shaper and timer output wave, final right hand form of Figure 5, is applied directly to the S-T and I-C alarms, 35 and 36, respectively, which are gated so as not to be activated by voltage peaks lower than the value indicated by S-T and I-C in the final wave form of Figure 5. If such voltage peaks are applied to these elements, the appropriate circuit is energized and the switch 21 or 20, respectively, is opened to de-energize the motor and set the brake 11. Such direct gating cannot be used for O-C and D-T conditions as these voltage peaks are less than the normally acceptable range. Therefore, the shaper output is also applied to the elements 37 and 38 labelled O-C detector and D-T detector which energize the O-C alarm 39 or D-T alarm 40, respectively, if the elements 37 and 38 receive voltage having peaks indicated by D-T and O-C in the final wave form of Figure 5. In any event, whichever alarm is energized is also operative to open the associated motor control switch to terminate the testing operation. Since the motor control and brake solenoids are designed to act very quickly, the armature generally will be stopped with the prods 27 and 28 resting upon the commutator bars connected to the particular armature coil found to have a fault. In normal production procedure, this latter feature generally will be of no particular interest as the existence of a fault will necessitate rejection of the armature in any event. However, in analysis of particular test armatures and in checking upon the performance of winding machinery and operators, it is frequently desirable to know not only the nature of the fault but its particular location in an unsatisfactory armature.

In the case of a faulty armature, the test apparatus will be stopped with the cam 25 in some angular position in which it does not engage the switch 15. As soon as a fault is indicated, the operator applies a suitable marking to the commutator bars upon which the prods 27 and 28 are resting if that information is desired. The prod support 29 is then rotated to the position of Figure 1 which removes the prods from engagement with the commutator. A normally open push switch 42 is connected in shunt with the series connected switches 20 to 23 inclusive; consequently, the motor and solenoid 13 are energized when the switch 42 is held closed by the operator regardless of the condition of the switches 20 to 23, and motor rotation continues until the motor and solenoid are de-energized when the cam 25 opens the switch 15.

Once a fault has been indicated, the switch associated with that fault indicator remains open and the alarm remains in alarm condition. In order to reset the system, it is necessary to interrupt the plate voltage supply to the alarm system 35, 36, 39 and 40. These alarm systems are applied with a regulated plate voltage, for example, 300 volts, from the supply line designated 300R through a normally closed cam switch 44. The cam switch 44 is moved to the open circuit position by a cam 45 driven by a pair of gears 46 from the shaft 8. The time period of one rotation of the cam 45 is the same as that for the cam 25, and it is arranged to open the switch 44 at the time the switch 15 is open. The cam 45 has a greater angular extent than the cam 25 in order to delay the application of plate voltage to the alarm system for a short period after the motor is energized at the start of a testing operation to prevent false indication due to transients which may occur at the very beginning of a testing operation. Since the armature is rotated one and a half revolutions for a complete test, this delay period does not interfere with the operation of the device, as every coil will be subjected to a full test in any event.

As the arm 29 rotates to the position of Figure 1, the cam 41 carried thereby actuates a normally closed circuit switch 43 to open circuit position. The switch 43 is for the purpose of de-energizing the A-F generator 17 when the prod carrying arm 29 is raised to remove the prods from the commutator. With the A-F generator 17 de-energized, no voltage is induced in the armature 1 and it is perfectly safe to remove the same from the chuck 7 and bearings 4 as the operator desires. As shown here, the switches 43 and 44 remove plate voltage from the A-F generator and fault alarms; however, the switches may operate through relays if desired.

Figure 2:
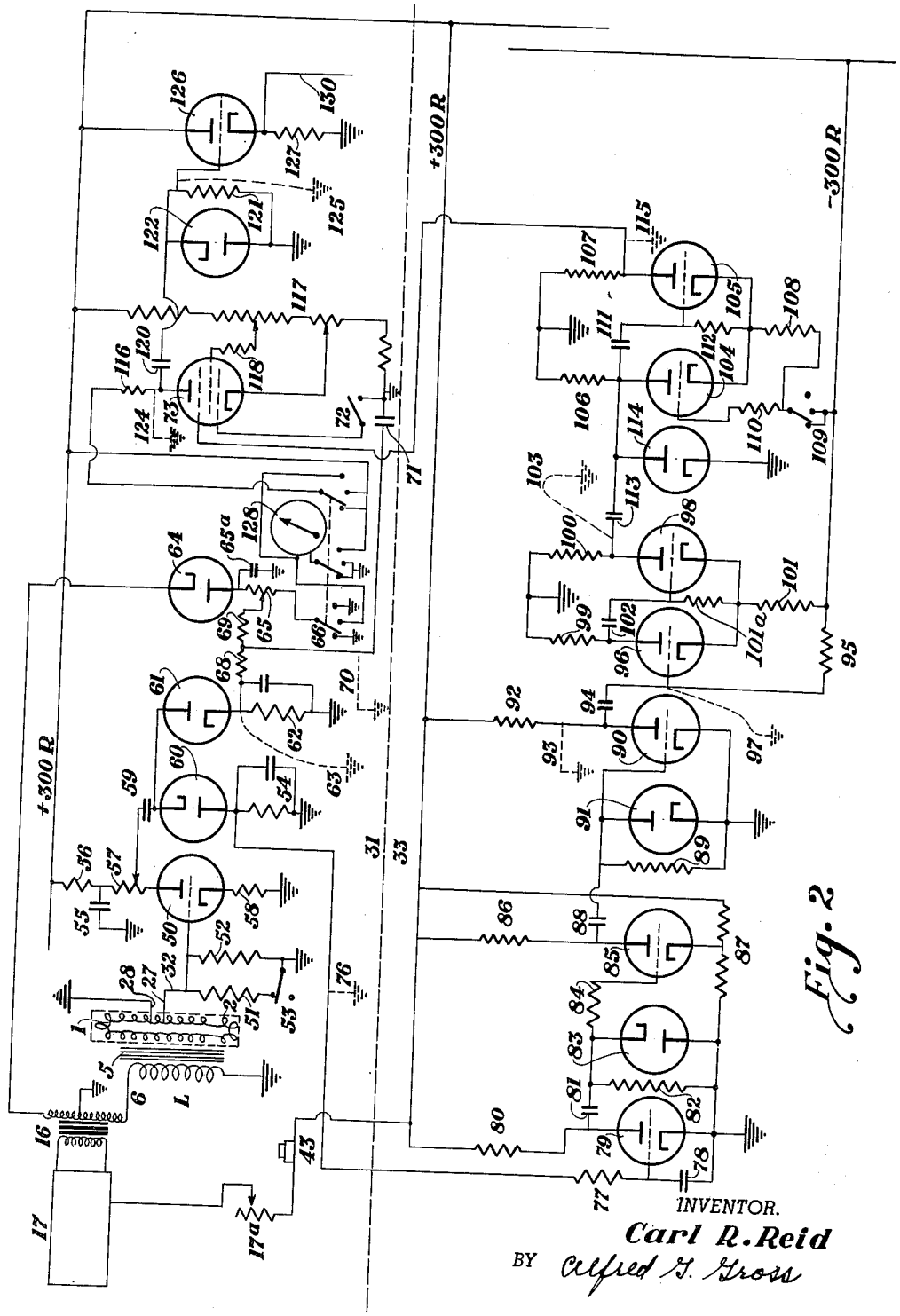
Figure 2 is a wiring diagram of an electronic mechanism for segregating the informative and non-informative portions of the voltage induced in each coil of a test armature and conditioning the same to operate a detecting and indicating mechanism.

Referring to Figure 2, the prod signal conductor 32 connects to the grid of an amplifying triode 50 in the shaper 31. The prod signal is developed across the parallel connected resistors 51 and 52 which are grounded. If an open circuit armature coil is in prod position, the prods are connected by a comparatively high impedance circuit consisting of the remaining armature coils in series. The value of the resistor is chosen to permit a current flow through this high impedance path sufficient to produce an impedance drop of approximately 50% of the prod voltage for a normal coil. If the armature contains more than one O-C coils, the prod signal voltage will be zero which will produce an O-C alarm as explained hereinafter. If the armature coil in prod position contains a gross deficiency of turns, the prod signal voltage will be in the O-C range and the tester will so indicate. Manual means are provided to distinguish this condition if desired consisting of a normally closed switch 53. When the switch 53 is opened, resistor 51 is disconnected and high resistor 52 only is in the prod circuit. The resistor 52 prevents significant current flow through the armature; hence an open circuit coil in prod position under these conditions will result in a prod signal of practically normal value, whereas a coil having a gross deficiency of turns will still produce a low value prod signal.

Figure 6:
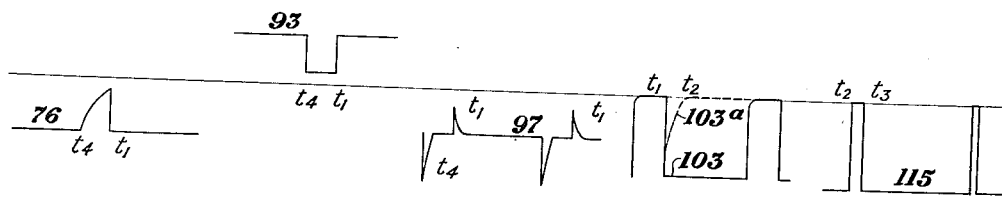
Figure 6 is a representation of the charge impressed upon a portion of the signal shown in Figure 4 to effect a proper timing of certain portions of the apparatus.
Figure 7:
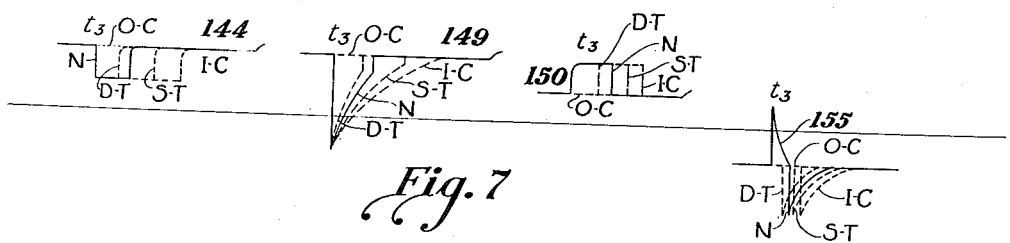
Figure 7 is a representation of transformations imparted to the final signal shown in Figure 5 for the purpose of selecting the proper alarm signalling mechanism.

The cathode of the triode 50 is grounded through a resistor 58 and the anode is connected to the plus 300R service through serially connected resistors 56 and 57 which connect at their junction to grounded condenser 55. The condenser 55 and resistor 56 constitute a decoupling filter to isolate the plus 300R service from the triode 50 to minimize the effect of this element on other parts connected to the plus 300R service. The variable resistor 57, triode 50 and resistor 58 form a degenerative stiffening amplifier for the prod signal. The output of the amplifier is developed across a pair of parallel connected impedances of opposite polarity sense consisting of a condenser 59 and oppositely connected diodes 60 and 61 having their anodes and cathodes, respectively, grounded through integrating filters 54 and 62, respectively. The identical filters 54 and 62 each consist of a resistor and a condenser connected in parallel. The condenser 59 has a large capacity and is a current integrating member to avoid cumulative D. C. component in the output of the triode 50 as the voltage level of this output is used to determine coil condition. The negative portion of the output of the triode 50 is passed by the diode 60 and the voltage across the filter 54 is applied to the timer 33 as described hereinafter. The value of the filters 54 and 62 is primarily determined by the need to approach a D. C. voltage across the filter resistors, but the filter time constants must permit voltage decay substantially to zero when the prods engage insulating segments on the commutator; i. e. time $t_4$ to $t_1$. The output, cathode to ground, voltage of the diode 61 is represented by the line 63 of Figure 5. This voltage, and all voltage conditions of Figures 5 to 7, are indicated by a dashed line to ground with the appropriate reference character applied to the schematic diagrams of Figures 2 and 3.

The signal voltage 63 is compared to a standard reference voltage for purposes of enhancing and clearly pointing out deviations thereof from an acceptable normal condition. For this purpose, the secondary of the transformer 16 is shown as having a grounded center point with the energizing coil L fed from one end thereof and the cathode of referencing diode 64 fed from the other end thereof. Thus the instantaneous voltage on the cathode of the diode 64 is always equal and opposite to the input to the coil L, neglecting impedance losses. The anode of the diode 64 is grounded through an integrating filter comprising a variable resistor 65 and a capacitor 65a parallel connected having a value equal to the filter 62 to insure equal degrees of filtration in the output of the diodes 61 and 64. The resistor 65 is connected to one pole of a three pole, three position switch 56. This switch is shown in the position in which the filter 65—65a is grounded and is used for a calibration purpose to be described more fully hereinafter. The cathode of the diode 61 and the variable point of resistance of the resistor 65 are joined by a pair of equal resistors 68 and 69. When properly calibrated, the voltage at the junction of 68 and 69 is zero during the bar period of a standard armature coil. The voltage across the resistor 69 is steady and of opposite polarity to voltage 63 as indicated by the voltage line 67 in Figure 5. The family of voltages indicated by the reference character 70 in Figure 5 are typical plots of the voltage between the junction of the resistors 68 and 69 and ground during normal operating conditions. If an armature condition other than normal obtains, the filtering combination 62 and 65—65a will not balance perfectly and for this reason, an additional grounded filtering condenser 71 is connected to the junction point of the resistors 68 and 69 to insure that the voltage 70 will be a nearly steady D. C. voltage of polarity and magnitude determined by the value of the voltage 63. A normally open switch 72 is connected in shunt with the condenser 71 for calibration purposes to be described more fully hereinafter. The junction point of the resistors 68 and 69 is also connected to the control grid of a keyed amplifier 73.

Before proceeding further with the shaper unit, it is desirable to digress and describe the timing unit in detail. The primary function of the timing unit is to identify a time instant closely associated with the time indicated at $t_1$ very positively. The reference $t_1$ is used herein to designate this time instant associated with time $t_1$ as they are usually identical and almost coincidental at all events. In the voltage charts of Figures 4 to 8, this time is shown as being identified by a very sharp volage change. This is an idealized condition as transients almost certainly will occur at the beginning of each bar period of operation. The prods may bounce and momentarily make and break contact one or more times, producing a series of sharp voltage changes at approximately this time. In addition, under open circuit conditions, for example, the magnitude of the voltage change or changes at time $t_1$ may be very small.

In order to secure positive identification of the time $t_1$, the negative half of the prod signal is diverted from the shaper 31 to the timer 33 by connecting the anode of the diode 60 to ground through serially connected resistor 77 and condenser 78 which form an integrating filter. The anode to ground voltage of the diode 60 is represented by line 76 of Figure 6. The junction of the condenser 78 and resistor 77 is connected to the grid of the squaring and amplifying triode 79 having a grounded cathode and an anode connected to the plus 300R service through a load limiting resistor 80. The output of the triode 79 is applied across a filter consisting of the condenser 81 and resistor 82 having a time constant such that it tends to square the output of the amplifier 79. The voltage variation across the resistor 82 is referenced to ground by the diode 83 so that only positive excursions of the voltage across the resistor 82 are applied to the resistor 84 which connects to the grid of a second amplifying triode 85. The anode of the triode 85 is connected to the plus 300R service through a load limiting resistor 86 and the cathode is connected to a voltage divider 87 connected between the plus 300R service and ground so as to place a fixed bias, 8 volts for example, upon the triode 85. The voltage applied to the grid of the triode 85 will have a peak amplitude of the order of 20 to 35 volts and the 8-volt bias placed on the cathode insures that this tube will be saturated during any period in which the input voltage thereof exceeds 8 volts thus affecting a further squaring action on the input wave form. The output of the amplifier 85 is developed across the series connected condenser 88 and the resistor 89 to affect a further squaring action thereon. The voltage across the resistor 89 is referenced to ground by the diode 91 and is applied to the grid of a triode 90. The anode of the triode 90 is connected to the plus 300R service through a load limiting resistor 92 and the cathode is grounded. The output voltage between the anode of the triode 90 and ground is represented by the voltage 93 of Figure 6, which has a very square form and has now produced a fair identification of the instants $t_4$ and $t_1$. The amplifier 90 is saturated from instants $t_4$ to $t_1$ and is cut off from $t_1$ to $t_4$ to produce the square wave form 93; that is, the repeated squaring of the input voltage to the timer, amplification of the minimum amplitude portions thereof and discarding of maximum amplitude portions thereof has produced the wave form 93 which is substantially independent of the voltage variations of wave form 76 due to varying armature conditions as well as sharply associated with the instants $t_1$ to $t_4$.

The apparatus also includes a source of negative voltage identified here as minus 300R, meaning 300 volts negative regulated. The anode of the amplifier 90 is connected to the minus 300R service through the condenser 94 and resistor 95. The junction of the condenser 94 and resistor 95 is connected to the control grid of the first stage 96 of a delay multi-vibrator. Due to the differentiating action of the filters 94 and 95, the voltage has a constant negative D. C. bias with sharp positive and negative going peaks at the times $t_1$ and $t_4$, respectively, as shown at 97 in Figure 6.

The multi-vibrator includes the triode tubes 96 and 98 having their anodes coupled through resistors 99 and 100 with the junction points grounded. The cathodes of these tubes are coupled together and to the minus 300R service through a load limiting resistor 101. The anode of tube 96 is connected to the junction points of the cathodes of the multi-vibrator through the series connected condenser 102 and resistor 101a. The junction point of the resistor 101a and condenser 102 is also connected to the control grid of the tube 98. The bias on the grid of the tube 96, as represented by the wave form 97, is normally highly negative and maintains this tube cut off, whereas the tube 98 is saturated. As each positive going spike on the wave form 97 hits the grid of the tube 96, this tube is triggered into conduction resulting in a very sudden voltage drop across the resistor 99 which is reflected in amplified form across the resistor 101, driving the grid of the tube 98 suddenly negative well below the cut off value. When this occurs, the tube 98 shifts suddenly from saturated operation to cut off operation and tube 96 begins to conduct at some value below saturation. As the apparatus stabilizes, the voltage across the resistor 101 decays at a rate determined by the time constant of the combination of the resistor-condenser 101a and 102 until the grid of the tube 98 reaches cut off value at which point the multi-vibrator reverts to its initial state in which it remains until the grid of the tube 96 is again triggered by a positive going spike on the wave form 97. The output of the delayed multi-vibrator, the potential of the anode of the tube 98 to ground, is represented by the wave form 103 of Figure 6; that is, the tube 98 is cut off from instants $t_1$ to $t_2$ and is saturated from instant $t_2$ to instant $t_1$. The time duration of $t_1$ to $t_2$ is determined by the time constant of the resistor-condenser combination 101a and 102 and must be chosen in reference to the number of bars on the test armature and the rate of rotation thereof to place the instant $t_2$ at some point approaching a mid-bar period at a time during which the prod signal may reasonably be assumed to be free of transients introduced by connection or disconnection of the prods to the particular commutator bar and bouncing of the prods introduced by riding over commutator insulating segments. The instant $t_2$ determines the initiation of the sampling period during which time the prod signal, after comparison with the standard reference level introduced through the triode 64 in the shaper 31, is actually measured to determine armature conditions. The duration of the sampling period is determined by a sampling multi-vibrator which consists of triodes 104 and 105 which are anode-coupled through resistors 106 and 107, respectively, with the junction of the two resistors grounded. The cathodes of the tubes 104 and 105 are connected together and are connected to the minus 300R service thru the resistor 108 and through position switch 109 which is preferably mechanically connected to switch 66 to be operated therewith. The grid of the tube 104 is connected to the minus 300R service through the switch 109 and resistor 110. A condenser 111 and resistor 112 are series connected across the cathode and anode of tube 104 and the junction of the resistor-condenser connects to the grid of the tube 105. The resistor 106 and condenser 113 form a filter which applies a sharp negative voltage spike at the instant $t_2$ to the anode of tube 104 and condenser 111 as shown by the dashed line 103a of Figure 6. The thus differentiated voltage 103 is utilized to trigger the sampling multi-vibrator. The positive going voltage spike which would normally be expected at instant $t_1$ is absorbed by a clipper diode 114. In the normal, stable state of the sampling multi-vibrator, the tube 105 is saturated and the tube 104 is cut off. Under normal conditions, the grid of the tube 104 is maintained at minus 300 volts and the cathode is positive with respect to this voltage by the voltage across the resistor 108. The negative going spike in the voltage 103a momentarily depresses the plate voltage on the tube 104 and discharges the condenser 111 sufficiently to drive the grid of the tube 105 below the cut off value, with the result that the negative grid to cathode of the tube 104 is removed and the tube conducts momentarily. After cut off at time $t_2$, the potential of the grid of the tube 105 decays exponentially back to the cut off value at which time the sampling multi-vibrator reverts to its stable state. The time between cut off of the tube 105 and return thereof to conduction is determined by the time constant of the filter combination of the condenser 111 and resistor 112. This time constant is preferably much shorter than the time constant of the delay multi-vibrator and is utilized only to determine the short duration of the sampling period, during which time the prod signal is actually acted upon to determine armature coil condition. The output of the sampling multi-vibrator is developed across the resistor 107 and is represented by the wave form 115 of Figure 6, which shows that the tube 105 is saturated except for the short cut off time period $t_2$ to $t_3$.

The anode of the tube 105 is connected to the suppressor grid of the keyed amplifier 73 of the shaper unit 31. The anode of the shaper unit of the keyed amplifier 73 is connected to the plus 300 volt service through the current limiting resistor 116 and one pole of the switching mechanism 66. In the position of the switch illustrated in Figure 2, the resistor 116 is connected to the plus 300R service. A voltage divider 117 consisting of a group of series connected resistors having two variable units is connected between the plus 300R service line and ground. The screen grid of the amplifier 73 is connected through a resistor 118 to one of the variable resistors of the voltage divider 117 and the cathode of the keyed amplifier is connected to the other variable resistor of the voltage divider 117. The potentials of the cathode and screen grid are adjusted to maintain the keyed amplifier 73 cut off except when the suppressor grid is at ground potential. The very square shape of voltage 115 insures that the suppressor grid will maintain the tube 73 cut off until instant $t_2$ when the suppressor grid potential is reduced to ground and will again cut off tube 73 at instant $t_3$ when the suppressor grid is again suddenly driven negative below cut-off value.

Figure 5:
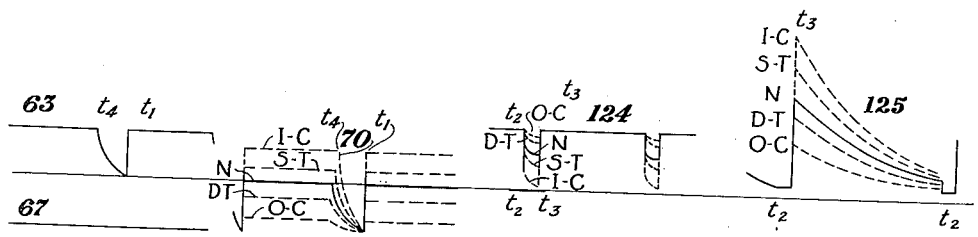
Figure 5 is a representation of various transformations imparted to the signal structure of Figure 4 to facilitate proper detection of armature conditions.

At the instant $t_2$, when the suppressor grid suddenly reaches ground potential, the keyed amplifier is placed under the effective control of the combined output voltages of the reference diode 64 and diode 61, which is represented by voltage 70 of Figure 5. During cut-off periods of the keyed amplifier 73, the condenser 120, which is connected to the cathode of the keyed amplifier and through the resistor 121 and clamping diode 122 to ground, accumulates a substantial charge through the resistor 116. As soon as the keyed amplifier begins to conduct, plate current is supplied to the amplifier through the resistor 116 from the plus 300R service and from the condenser 120 until the circuit stabilizes after which steady plate current is drawn from the plus 300 service alone. The duration of the sampling period, that is, $t_2$ to $t_3$, must be sufficient to insure the attainment of this stable operating condition as conduction ceases at time $t_3$ and the sampling period is terminated. The stable level of plate to ground voltage of the tube 73, represented by voltage 124 in Figure 5, during the sampling period is determined solely by the voltage input level on the control grid from the diodes 61 and 64. Consequently, the charge, voltage across the condenser at each instant $t_3$ is determined by the level of voltage 70 during the sampling period. At instant $t_3$, the total voltage available to produce current flow through resistors 116 and 121 is 300 minus the voltage across the condenser 120 or the final voltage drop across resistor 116 in the preceding sampling period and the voltage across resistor 121 is a function of the voltage across 116 which is represented by voltage waves 125 in Figure 5.

The voltage 125 is characterized by a sharp peak at the time $t_3$ which decays exponentially to the next succeeding time $t_2$. The voltage 125 is applied to the grid of a stiffener triode or cathode follower 126, having the anode thereof connected directly to the plus 300R service and the cathode thereof grounded through a resistor 127 across which the output voltage of the shaper unit 31 is developed. The wave form 125 also qualitatively represents the output voltage of the stiffener 126 and is the voltage which is applied to the alarm and detecting units to be described.

The shaper 31 is calibrated as follows: Switches 9a and 44a are opened to prevent motor rotation and actuation of the alarms. The switch 13a is actuated to closed position to release the brake 11. An armature having a standardized coil is then placed in the bearing support 4 and rotated to place the standardized coil in prod position, after which the arm 29 is lowered, care being taken to insure that the prods engage the commutator bars connected to the standardized coil. The switches 66 and 109 are then thrown to the mid-position which grounds the filter 65 through the meter 128 and removes bias voltage from the sampling multi-vibrator. The potentiometer 17a is next adjusted until a full scale deflection of the meter is obtained which will correspond to approximately a 10-volt drop across the resistor 65. The adjusting arm of the adjustable resistor 65 is then locked in the mid-position to give a voltage at the junction of the points 68 and 69 of approximately plus 5 volts. The switches 66 and 109 are next actuated to the right hand position as shown in Figure 2 which places the meter 128 in the plate circuit of the amplifier 73 and maintains the multi-vibrator in inactive condition. Almost immediately following disconnection of the minus 300 service to the multi-vibrator, the suppressor grid of the keyed amplifier 73 assumes ground potential which is the condition occurring during a sampling period. The switch 72 is then closed to place the control grid of the keyed amplifier at ground potential. The adjustable portions of the voltage divider 117 are next adjusted to vary the potential on the screen grid and cathode of the keyed amplifier until the meter 128 has approximately half scale deflection. The switch 72 is now opened and the resistor 57 in the prod amplifier output circuit adjusted until the meter again reads half scale, indicating that the output of the prod diode 61 is exactly equal and opposite to the output of the referencing diode 64, and that the control grid of the keyed amplifier is at ground potential. At this time, the switch 72 may be opened and closed and a failure of this action to alter the deflection of the meter 128 is a check on the calibration. The calibration procedure is now complete and the switches 109 and 66 are actuated to restore service to the multi-vibrator and to remove the meter 128 from circuit. Switch 13a is opened and switch 44a is closed to restore the apparatus to operating condition.

Figure 3:
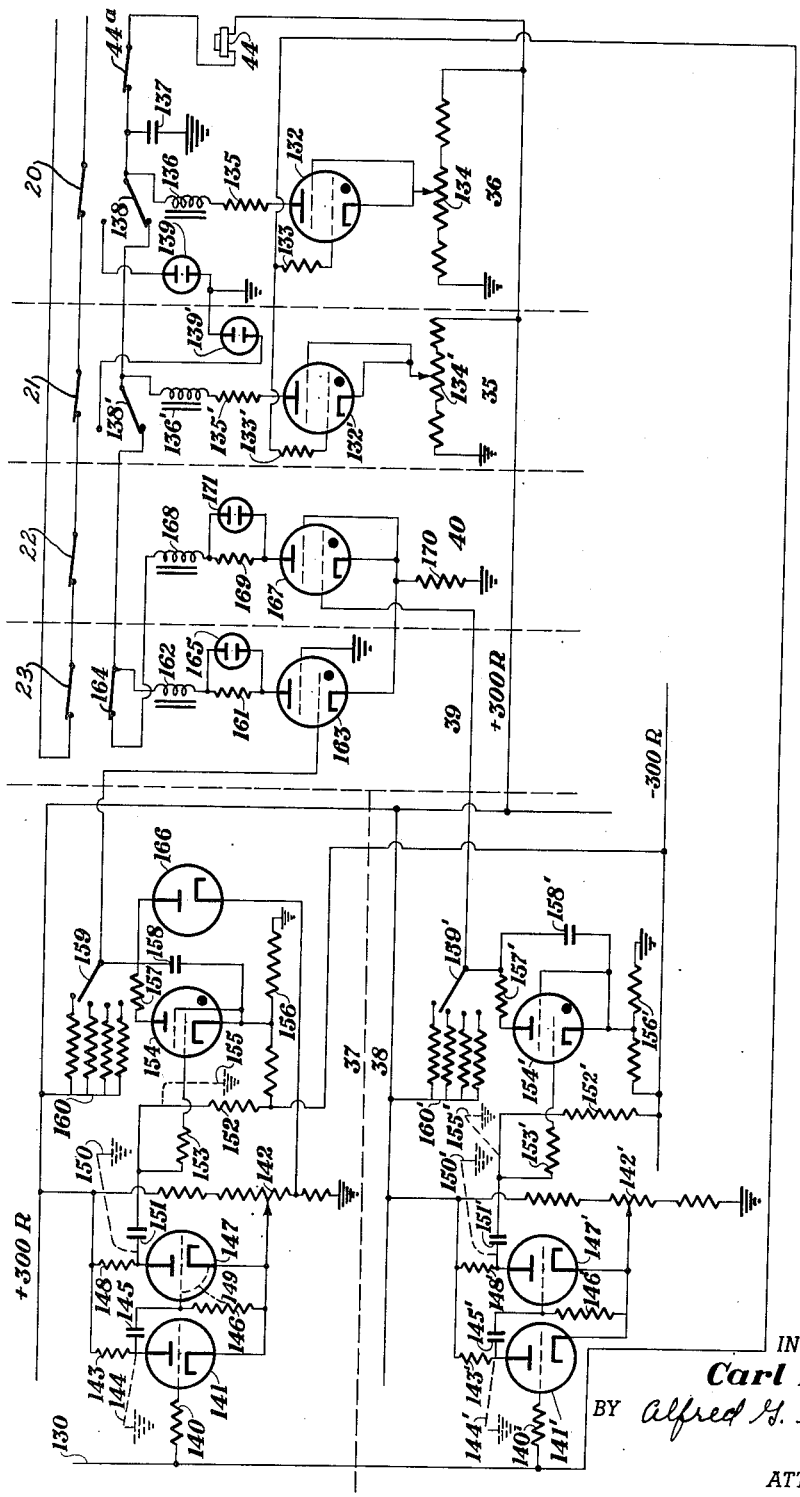
Figure 3 is a schematic wiring diagram of a detecting and alarm signalling apparatus which is driven by the apparatus of Figure 2.

Referring now to Figure 3, the open circuit and deficient turn detectors, 37 and 38, respectively, and the open circuit, deficient turns, surplus turns and incorrect connection alarms, 39, 40, 35 and 36, respectively, are shown as a single figure, the separate units being segregated by dashed lines. The output signal of the shaper is applied to the unit of Figure 3 by the conductor 130 connected to the cathode of the stiffener triode 126.

Detection of S-T or I-C conditions is relatively simple as these conditions are represented by peak values of the voltage 125 above a predetermined value without particular concern with a time reference.

The I-C alarm 36 is activated from the shaper by connecting the control grid of the I-C thyratron 132 to the conductor 130 through a grid current limiting resistor 133. The screen grid and cathode of the thyratron are connected to the plus 300 service through a voltage dividing resistor bank 134 to maintain the cathode and screen grid at a previously determined potential to be produced in the shaper output by an incorrect connection which will insure that the thyratron 132 will not fire unless the signal applied to the control grid indicates the presence of an incorrect connection. The anode of the thyratron 132 connects to a serially connected current limiting resistor 135, relay coil 136 to the manual plate voltage supply control switch 44a. A filtering condenser 137 is connected between the plate voltage supply line and ground to protect the alarm from transient voltage conditions. The relay 136 opens circuit switches 20 and 138 when energized to stop the motor 9 and set the brake 11 to discontinue testing operating and to remove plate voltage from the other fault alarms. Switch 138 is a double throw switch and energizes an I-C neon glow fault lamp 139 when actuated by the relay coil to open the plate voltage supply to the remaining alarm system. Energization of the lamp 139 indicates the existence of an incorrect connection in a test armature.

The S-T fault alarm 35 is similar in all respects to the I-C alarm just described and corresponding parts are given the same reference characters distinguished by the addition of a prime. The screen grid and cathode of the S-T alarm thyratron 132' are connected to the voltage divider 134' to bias the thyratron 132' to a lower value than the static bias on the thyratron 132. The value of the bias on the thyratron 132' is the upper limit of the shaper output voltage produced by an acceptable armature. Consequently, a peak voltage on the wave 125 indicating an S-T condition will not bias the thyratron 132 into conduction but will bias the thyratron 132' into conduction, resulting in energization of the relay 136' to open switches 21 and 138' which stops the test, removes plate voltage from the O-C and D-T alarms, and energizes the S-T signal lamp 139'. In this connection, it is to be noted that a peak voltage value indicating an I-C condition in a test armature is sufficient to render the thyratron 132' conductive; however, the thyratron 132 will fire simutaneously and actuate switch 138 to remove plate voltage from the S-T alarm system, thus preventing false alarm indication.

Distinguishing between O-C and D-T faults is more complicated than distinguishing S-T and I-C faults because the former two conditions are evidenced by failure of the voltage 125 to reach a particular value at a determined time.

The O-C detector 37 is activated by the output voltage signal 125 from the shaper unit which is applied through the conductor 130 and current limiting resistor 140 to the grid of a triode gate tube 141. The cathode of the gate tube 141 is connected to a voltage divider 142 which is connected between the plus 300 service and ground to establish a static bias level on the gate 141. The bias on the cathode of the tube 141 is such that the tube remains cut-off as long as the signal applied to the grid is below the value previously determined as the maximum produced in the shaper output by an open circuited armature coil. Any signal voltage exceeding the maximum O-C value of the shaper output triggers the gate tube 141 into conduction. The anode of the tube 141 is connected to the 300 service through a current limiting resistor 143. The output of the triode 141, as represented by variation of the anode to ground voltage thereof is indicated by the line 144 of Figure 7. It is to be noted, in this connection, that an open circuit condition does not cause an alteration in plate voltage of this tube; hence the plate voltage for this condition is a straight line at plus 300 volts. Signals applied to the grid of this tube representing D-T, normal, S-T or I-C conditions trigger the tube into conduction. A voltage signal at this point representing a normal D-T condition may or may not trigger the gate tube to the saturation point, though it is so indicated in Figure 7. The anode and cathode of the tube 141 are connected by the serially connected condenser 145 and resistor 146 with the junction thereof connected to the grid of an inverter tube 147. The cathode of the tube 147 is maintained at the same potential as the cathode of the tube 141 and the anode is connected to the plus 300 service through a current limiting resistor 148. The grid to cathode voltage of the inverter 147 is represented by the wave form 149 of Figure 7 which is characterized by sharp negative going spikes for all conditions other than open circuit or gross deficiency of turns. The anode voltage of the tube 147 varies between saturation and cut-off conditions depending upon the value of voltage 149. For open circuit conditions, voltage 149 is steady and the inverter 147 remains saturated. The negative going spikes produced by conditions other than open circuit cut off tube 147 causing plate to ground voltage conditions represented by the voltage 150 of Figure 7. The output of tube 147 is developed between the plate and the minus 300 service through serially connected condenser 151 and resistor 152. The junction point of the condenser 151 and resistor 152 is connected through a current limiting resistor 153 to the control grid of a saw-toothing thyratron 154. The differentiating effect of the condenser 151 and resistor 152 produces a voltage form represented by 155 of Figure 7 characterized by a sharp positive going spike at time $t_3$ for all operating conditions except open circuit, even though the maximum value of the positive going spike is negative with respect to ground. The screen grid and cathode of the thyratron 154 are biased negative by being connected to the voltage divider 156 extending between the minus 300 service and ground. The positive going spikes on the voltage 155 reduce the control grid to cathode voltage of the thyratron 154 below the firing point and the tube will fire for all conditions other than open circuit or gross deficiency of turns. The anode of the thyratron 154 is connected to a current limiting resistor 157 which is proportioned to allow plate current within the tube rating. The resistor 157 connects to a condenser 158 which is connected to the cathode of the tube 154. The resistor 157 also connects to a switch 159 arranged selectively to be connected to any one of a plurality of resistors 160 in turn connected to the plus 300 service.

Relative voltage levels are important in the open circuit detector unit. Under the conditions assumed herein, the negative bias on the cathode of the gate tube 141 determined by the setting of the voltage dividing bank 142 determines the setting of the gate tube or the minimum amplitude of voltage 125 which will trigger the gate tube into conduction. This value, for example, may be 75 volts positive which will establish a boundary level between the formal open circuit and deficient turn output level of the shaper unit. The steady state level of voltage 155 is minus 300 and the voltage divider bank 156 maintains a negative bias of, for example, minus 246 volts on the cathode of the thyratron 154. Thus, any positive value of voltage 155, which reduces the thyratron grid to cathode voltage below the cut-off value, minus three and a half volts for example, will trigger the thyratron into conduction, or a peak amplitude of the positive spike on the wave form 155 of 50.5 volts above the base level. The cascaded gate and inverter may be assumed to have an amplification value of at least 100. Therefore, any value of voltage 125, which reduces the negative grid to cathode voltage of the gate tube 141 approximately .55 volt below cut-off value, will actuate the open circuit detector. If it be assumed that the gate tube is provided with a 75 volt bias and has a negative grid to cathode cut-off voltage value of 13, the minimum peak amplitude of voltage 125, which will just trigger the tube 141 into conduction, is 62.55 volts which establishes the boundary between O-C and D-T conditions. Due to the amplification factor, halving the effective amplification, for example, would increase the minimum thyratron triggering voltage and it appears in voltage 125 to 63.10 volts; that is, the detector channel arrangement just described provides sharp differentiation between O-C and D-T conditions rather independently of exact amplification in the gate and inverter stages.

During any extensive period of non-conduction of the thyratron, the condenser 158 acquires a charge by current flow through one of the resistors 160 from the plus 300 service. When the thyraton 154 is triggered into conduction, the plate current permitted by the resistor 157 is much greater than the current which can be drawn through the resistor 160. Consequently, plate current is drawn from the condenser 158 which gradually lowers the anode voltage below the ionization value, ten volts for example, causing the tube to cease conduction with an instantaneous anode voltage on the thyratron of minus 236 volts, assuming that the cathode is maintained at 246 by the voltage divider 156. The time constant of the condenser 158 and resistor 160 must be closely correlated to the prod frequency of the test armature; that is, this time constant must be great enough to prevent the anode voltage of the thyratron from increasing from its minus 236 value to ground potential in the interval between succeeding time periods identified as $t_3$ and must permit the anode voltage to decay to ground potential in a time period which is less than twice the time interval between succeeding time periods identified as $t_3$. The plurality of resistors 160 are provided for the purpose of changing this time constant in order to accommodate the apparatus for testing armatures having varying numbers of commutator bars.

Figure 8:
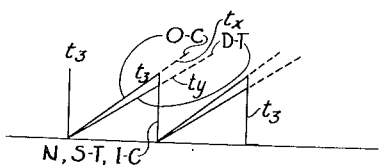
Figure 8 is a diagram representing the manner in which two closely related types of armature faults are distinguished from each other.

The output voltage of the open circuit detector 37 and deficient turn detector 38 is plotted in Figure 8, the two voltage conditions being identified by O-C and D-T, respectively. Each time the thyratron 154 fires at a time $t_3$, which means that the particular coil under test is not subject to open circuit, the O-C voltage wave is driven sharply negative to the minus 236 value and begins to decay in a positive direction in the ensuing time interval. When the next time interval $t_3$ arrives, the voltage on the anode of the thyratron 154 will still be well below ground and will again be driven to its maximum negative value if the thyratron fires on the next instant $t_3$. If the thyratron should not fire on the next instant $t_3$, indicative of an O-C condition in the coil under test, the anode voltage of the thyratron 154 will continue to decay in accordance with the dashed line to ground potential, or shortly following time $t_3$.

The output voltage of the thyratron 154 is applied directly to the control grid of the O-C alarm thyratron 163. The cathode of this thyratron is grounded through a current limiting resistor 170 and the screen grid is directly grounded. The anode of the thyratron 163 connects to the 300 service supply from switch 44a through a current limiting resistor 161 and relay coil 162. The thyratron 163 is of the type which will begin conducting when the grid thereof substantially reaches ground potential. At any instant $t_3$ at which the thyratron 154 fails to fire, the anode voltage thereof will decay to ground shortly thereafter thyratron 163 will fire and draw plate current through the relay 162. The relay 162 actuates switch 23 to de-energize the drive motor and switch 164 to remove plate current from the D-T alarm 48. A neon glow signal lamp 165 is connected to be actuated by the voltage drop through the resistor 161 to provide a visual indication of the presence of an O-C or gross D-T condition in the coil under test.

The open circuit detector is provided with a current limiting diode 166 having its cathode connected to the voltage divider 142 to maintain a positive bias of approximately 50 volts thereon in order to limit peak values of output voltage from the thyratron 154 for a purpose described hereinafter.

The presence of more than one open circuited armature coil is a rare but occasionally encountered condition called multiple O-C. If the test armature is subject to multiple O-C, the prod signal will be zero when the first open circuit coil is in prod position because the high and low impedance paths through the armature between the prod bars will each be open circuited. Such a prod signal will not produce a sampling period in the timer 33 and the shaper output will be at ground potential. The O-C alarm will fire, however, because there will be no signal input to the O-C detector operating to prevent O-C detector output voltage from decaying to ground potential at time $t_x$ and energizing the O-C alarm. In this special case, the O-C alarm will be given by the first of the open circuited armature coils to reach prod position, but there will be no indication of the location of the other open circuit armature coil.

The deficient turn detector 38 is identical with the open circuit detector 37 except that it does not require the protector diode 166 and the voltage biases are different. Those parts of the deficient turn detector which are identical with corresponding parts of the open circuit detector are identified by the same reference characters distinguished by the addition of a prime. The positive bias on D-T gate tube 141' will be set at 100 volts, for example, so that a peak value of voltage 125, which will just fire the open circuit detector 37, thus preventing O-C alarm, will fail to fire the D-T gate tube 141', which will ultimately result in a failure of the thyratron 154' to fire and allow the cathode to ground voltage of the thyratron 154' to decay to ground potential. The condenser 158' and resistor 160' combination has a time constant which is slightly longer than the time constant of condenser 158 and resistor 160 as is shown by the comparative plots of the O-C and D-T voltages in Figure 8. It is to be observed also that a peak amplitude of voltage 125 insufficient to actuate the open circuit detector 37 will also be insufficient to actuate the D-T detector 38. However, under this condition, representing an actual open circuit in the coil undergoing test, the O-C alarm thyratron 163 will fire first because of the more rapid rate of decay of anode voltage for the thyratron 154 than for the thyratron 154'. Once thyratron 163 is fired, relay 162 removes plate voltage from the D-T alarm and prevents firing of that alarm regardless of the voltage on the anode of the thyratron 154'.

The output voltage of the anode of the thyratron 154' is applied to the control grid of a thyratron 167 which has its anode and screen grid connected through the resistor 170 to ground. The anode of the thyratron 167 is connected to the 300 volt service controlled by switch 44a through a relay coil 168 and a current limiting resistor 169. The D-T alarm neon lamp 171 is connected across the resistor 169 to be operated by the voltage drop therein when thyratron 167 fires. Once the D-T alarm thyratron 167 fires, the voltage drop through the resistor 170 places such a positive bias on the cathode of the thyratron 163 that a peak amplitude voltage of approximately 120 volts positive, for example, would be required on the plate of the thyratron 154 to fire thyratron 160. Since the limiter diode 166 is set to limit positive plate voltage on the thyratron 154 to a value not exceeding 50 volts, for example, firing of the thyratron 167 positively prevents subsequent firing of thyratron 163, which would give a false O-C indication.

With reference to the operation of the D-T detector 38, the various voltage plots of Figure 7 labelled O-C represent the corresponding voltage condition in the D-T detector 38 upon occurrence of an actual D-T condition indicated by failure of the tube 141' to be triggered into conduction.

With respect to S-T and I-C faults, the period between first contact of the prods with a bar connected to such a faulty coil and firing of the proper alarm is equal to the delay period $t_1$ to $t_2$ and the sampling period $t_2$ to $t_3$. The sum of this is usually approximately half a total bar period. Consequently, if the braking structure is made very quick-acting, the armature will be stopped with the prods engaging the commutator bars connected to the faulty coil and thus it not only indicates the nature of the fault but locates the particular coil containing it.

With respect to O-C and D-T faults, however, the period between the first prod contact with the bars connected to the faulty coil and the firing of the alarm is equal to the delay period $t_1$ to $t_2$, the sampling period $t_2$ to $t_3$, plus the voltage decay period following the fault period $t_2$ to $t_x$ or $t_y$, as the case may be, as indicated in Figure 8. Following this, the armature will stop within a time period determined by the brake. Since the time $t_3$ to $t_x$ must be great enough to be unaffected adversely by varying periods between succeeding $t_3$ instants due to inequalities in communtator bar spacing and the time $t_3$ to $t_y$ must be greater than the time $t_3$ to $t_x$ to allow a proper hold-off between firing of the O-C alarm and firing of the D-T thyratron, the armature may stop with the prods engaging the bars connected to the faulty coil or the next pair of communtator bars. In any event, this factor can be determined for any particular armature type under test and the prod bars of the preceding pair of commutator bars marked to indicate the faulty coil in such action is desired for precise study of fault conditions.

The present arrangement is such that an actual S-T condition will fire only the alarm thyratron 132' which will immediately remove plate voltage from the O-C and D-T alarm systems. An actual I-C condition will fire thyratron 132 and 132', tending to give a false S-T indication. However, firing of the thyratron 132 removes plate voltage from all other alarms and prevents a false indication being registered. Similarly, an actual O-C condition will tend to fire both alarms 163 and 167. However, the difference in time periods of the output filters of the O-C and D-T detectors will insure that the O-C alarm thyratron 163 will fire first, which will immediately remove plate voltage from the D-T alarm and prevent false indication thereof. In case of an actual D-T condition, the firing of thyratron 167 places a static bias on the thyratron 163 of a value which is greater than the maximum grid potential permitted to be applied to the thyratron 163 by the limiter diode 166, thus preventing false O-C indications.

Cathode heaters have been omitted from Figures 2 and 3 for clarity of illustration. The cathode heaters for the various tubes may be energized by conventional means and subjected to fixed D. C. bias by conventional means where this is desirable to avoid high heater to cathode potentials.

The test apparatus disclosed herein is particularly reliable from a calibration standpoint since calibration is accomplished by adjusting the voltage 70 to ground potential which is a value which can always be reliably reproduced. The gating level of the I-C and S-T alarms systems are readily adjusted by means of the variable resistors 134 and 134' while the signal level introduced from the shaper unit 31 with a standardized armature coil in prod position is adjusted by means of the variable resistors 57 to simulate a particular fault. Similarly, the gating level of the O-C and D-T detectors are adjusted under similar conditions by adjusting the variable resistors 142 and 142' with the resistor 57 or 95 adjusted to simulate particular faults.

Referring particularly to the representation of voltage 125 in Figure 5, the line marked O-C represents the boundary between armatures which are classed as O-C and those classified as D-T. The lines marked D-T and S-T are boundaries of armatures which will be accepted as normal and are determined by the outer limits of this voltage 125 produced by normal armatures. The line marked N is a standardized reference point. Similarly, the line marked S-T is the lower limit of voltage 125 produced by armatures which are marked S-T. The line I-C is the lower limit of the voltage 125 produced by armatures which will be considered open circuited. By the adjusting procedures just described, the voltage response levels can be adjusted to widen or narrow the limits of acceptable armatures and to adjust the alarms to respond to voltage levels which will truly represent particular fault conditions. In ordinary production usage, the nature of a fault indicated by the tester is not particularly material because the armature will be rejected for salvage in any event. However, for testing purposes to determine the location of faulty operations in production procedures, the nature of the fault discovered is of considerable importance and can be recorded in any suitable manner on a statistical basis if the number of rejects approaches a value indicating that improvement in production procedures is necessary.

Since the signal, which is actually utilized to determine armature coil conditions, is a result of a balance between two voltages, each of which emanates from the A-F generator 17, variations in the output of this element does not effect the efficacy or sensitivity of the test unit within rather wide limits.

The apparatus described herein has been found to be highly reliable and accurate in operation and to subject production line armatures to the desired series of tests at very low cost and in very short periods of time. The foregoing is particularly desirable because certain types of the faults detected by this apparatus may not be detected even when the motor is given a preliminary run in and will not appear until the motor is subjected to an overload or to a continuous period of operation, resulting in damage not only to the faulty armature but to other elements to which it is mechanically or electrically connected.

While the invention has been illustrated and described in detail herein, it is not to be limited thereto but various changes may be made in the construction, design and arrangement of parts without departing from the spirit of the invention or the scope of the appended claims.

I claim:

1. Armature testing apparatus comprising means for generating a magnetic field, means for rotating an armature to be tested in said magnetic field, a pair of contact members positioned to engage adjacent bars on the commutator of a test armature to pick up the voltage induced in each armature coil as it moves into a predetermined position, a plurality of signal alarms, means for measuring the voltage between said contacts as each armature coil moves to said predetermined position and for selectively energizing said alarms in accord with the voltage between said contacts if such voltage is without a predetermined range.

2. Armature test apparatus comprising means for generating a magnetic field, means for rotating an armature to be tested in said magnetic field, a pair of contacts adapted to engage the commutator of a test armature and to establish an electrical connection to each coil of a test armature as each such coil moves into a predetermined position in said magnetic field, means governed by the voltage between said contacts for generating a signal which varies in voltage level with variations in voltage level between said contacts, means for discarding all portions of said signal except the portion thereof derived from the potential between said contacts while said contacts engage a predetermined portion of each pair of commutator bars on a test armature, a plurality of alarm signals, and means for selectively actuating said alarm signals from the retained portion of said signal according to deviations of said signal from a predetermined range of voltage levels.

3. Apparatus according to claim 2 including means actuated by said alarm signal actuating means for stopping said armature rotating means when an alarm is actuated.

4. Armature test apparatus comprising means for generating a magnetic field, means for rotating an armature to be tested in said magnetic field, a pair of contacts adapted to engage the commutator of a test armature and to establish an electrical connection to each coil of a test armature as each such coil moves into a predetermined position in said magnetic field, means governed by the voltage between said contacts for generating a signal which varies in voltage level with variations in voltage level between said contacts, means for determining and fixing the time of first contact between said contacts and a connected pair of commutator bars independently of the rotational speed of a test armature for generating a second signal having a predetermined time lag with respect to such time of first contact and a time duration which is less than the remaining time of contact between said contacts and said connected pair of commutator bars, means normally blocking said first mentioned signal and actuated by said second signal to transmit that portion of said first mentioned signal which coincides in time with said second signal, a plurality of alarm signals and means activated by said transmitted portion of said first mentioned signal for selectively energizing said alarms according to deviations of said transmitted signal from a predetermined value.

5. Armature testing apparatus comprising means for rotating an armature to be tested, a source of current having a frequency per unit of time which is large compared to the frequency with which individual coils on a test armature are rotated by a fixed point per unit of time, means energized from said current source for generating a magnetic field linking a test armature driven by said rotating means, a pair of contacts positioned to engage commutator bars connected to opposite ends of individual coils on a test armature, means for deriving a first signal from said pair of contacts which is proportional to the voltage therebetween as each coil on a test armature is connected to said contacts, means for deriving a second signal from said current source having opposite polarity to said first signal and a value such that the sum of said second signal and the first signal produced by a standard normal armature coil is zero, means for deriving a third signal from said voltage between said contacts appearing in time delayed relation to the appearance of coil voltage between said contacts and terminating before the termination of such coil voltage between said contacts, and means for producing a fourth signal which is proportional to the sum of said first and second signals, means blocking operation of said fourth signal producing means except during the time said third signal is produced, a plurality of alarms, and means for energizing said alarms selectively in accord with deviations of said fourth signal from a predetermined range of values.

6. Armature testing apparatus comprising means for subjecting the coils of a test armature to a magnetic field of predetermined value, means for successively generating a signal proportional to the voltage induced in each coil of a test armature, a plurality of alarms, means for energizing certain of said alarms selectively according to the degree by which said signal exceeds a predetermined value, and means for energizing certain other of said alarms according to the degree by which said signal falls below said predetermined value.

7. Armature testing apparatus comprising means for subjecting the coils of a test armature to a magnetic field of predetermined value, means for successively generating a signal proportional to the voltage introduced in each coil of a test armature, a first alarm, a thyratron controlling the energization of said first alarm having a grid connected to receive said signal and biased to non-conduction unless said signal exceeds a first predetermined value, a second alarm, a thyratron controlling the energization of said second alarm having a grid connected to receive said signal and biased to non-conduction unless said signal exceeds a second predetermined value which is intermediate said first predetermined value and a normal signal value, a third alarm, a third thyratron controlling the energization of said third alarm and having a control grid, means connected to receive said signal and actuated by each successive signal exceeding a third predetermined value below said normal signal value for applying a bias voltage to said third thyratron grid sufficient to maintain said third thyratron cut-off for a time period exceeding the time period between successive signals, a fourth alarm, a fourth thyratron controlling the energization of said fourth alarm and having a control grid, and means connected to receive said signal and actuated by each successive signal exceeding a predetermined value below said third predetermined value for applying a bias voltage to said fourth thyratron grid sufficient to maintain said fourth thyratron cut-off for a time period exceeding the cut-off time period of said third thyratron.

8. Apparatus according to claim 7 including means energized by said first thyratron for de-activating said third, second and first alarms, means energized by said second thyratron for de-activating said second and first alarms, means energized by said fourth thyratron for de-activating said third alarm and means activated by said third thyratron for de-activating said fourth alarm.

9. Armature testing apparatus comprising means for generating a magnetic field, means for rotating an armature to be tested in said magnetic field, means for generating a signal proportional to the voltage induced in each coil of a test armature as each armature coil moves to a predetermined position in said magnetic field, a first alarm, a thyratron controlling the energization of said first alarm having a grid connected to receive said signal and biased to non-conduction unless said signal exceeds a first predetermined value, a second alarm, a thyratron controlling the energization of said second alarm having a grid connected to receive said signal and biased to non-conduction unless said signal exceeds a second predetermined value which is intermediate said first predetermined value and a normal signal value, a third alarm, a third thyratron controlling the energization of said third alarm and having a control grid, means connected to receive said signal and actuated by each successive signal exceeding a third predetermined value below said normal signal value for applying a bias voltage to said third thyratron grid sufficient to maintain said third thyratron cut-off for a time period exceeding the time period between successive signals, a fourth alarm, a fourth thyratron controlling the energization of said fourth alarm and having a control grid, and means connected to receive said signal and actuated by each successive signal exceeding a predetermined value below said third predetermined value for applying a bias voltage to said fourth thyratron grid sufficient to maintain said fourth thyratron cut-off for a time period exceeding the cut-off time period of said third thyratron, means energized by said first thyratron for de-activating said third, second and first alarms, means energized by said second thyratron for de-activating said second and first alarms, means energized by said fourth thyratron for de-activating said third alarm, means activated by said third thyratron for de-activating said fourth alarm, and means energized by each of said thyratrons when rendered conducting for stopping rotation of a test armature.

10. Armature testing apparatus comprising means for generating a magnetic field, means for rotating an armature to be tested in said magnetic field, means for generating successive signals each having a voltage proportional to the voltage produced in each coil of a test armature as each armature coil is moved to a predetermined position in said magnetic field, a fault alarm, a thyratron connected to energize said alarm when conducting and having a control grid, a resistor and a condenser connected in series across sources of potential above and below the grid cut-off potential of said thyratron, said thyratron grid being connected to the junction of said condenser and resistor, means actuated by each of said successive signals having a voltage above a predetermined value for driving the voltage of said junction to a negative value below said grid cut-off value, and said condenser and resistor having a time constant such that the voltage of said junction decays from said negative value to said cut-off value in a time period exceeding the time period between said successive signals.

11. Apparatus according to claim 10 including a second fault alarm, a second thyratron connected to energize said second fault alarm when conducting, a second condenser and a second resistor connected in series across sources of potential above and below the cut-off value of said second thyratron grid, said second thyratron grid being connected to the junction of said second condenser and second resistor, means actuated by each of said successive signals having a voltage above a second predetermined value which is higher than said first mentioned predetermined value for driving the voltage of said second mentioned junction to a negative value below said grid cut-off value, and said second condenser and second resistor having a time constant such that the voltage of said second mentioned junction decays from said negative value to said cut-off value in a time period exceeding said first mentioned time period.

12. Armature testing apparatus comprising means for rotating an armature to be tested, a source of alternating current having a frequency which is large compared to the frequency with which individual coils on a test armature will be rotated by a fixed point by said rotating means, means energized from said current source for subjecting an armature rotated by said rotating means to a magnetic field, a pair of prods positioned to engage a pair of commutator bars on a test armature connected to opposite ends of individual armature coils as each such coil is rotated to a predetermined position in said magnetic field, means for comparing that portion of the current in said prods produced by the voltage induced in the coils of a test armature as each such coil assumes a predetermined position in said field having one polarity to a current of opposite polarity derived from said source and having a voltage equal and opposite in polarity to compared prod current produced by a standard armature to produce a difference signal, means actuated by that portion of the current produced in said prods which is opposite in polarity to that portion of prod current used to generate said difference signal for producing a sampling signal during the said portion of the time said prods engage each pair of commutator bars connected to individual coils of a test armature, means actuated by said difference signal and controlled by said sampling signal for producing an alarm signal proportional to said difference signal and initiated in time coincidentally with said sampling signal, and a plurality of alarms selectively actuable by values of said alarm signal differing from a predetermined normal range of values of said alarm signal.

13. Armature testing apparatus comprising electrically energized means for rotating an armature to be tested, a field structure positioned to embrace an armature driven by said rotating means, a winding on said field structure, means for energizing said winding, a pair of prods for engaging the commutator of an armature to be tested, means mounting said prods for movement to and from commentator engaging position, a plurality of fault alarms, means connected to said prods for selectively energizing said fault alarms according to deviations in the voltage between said prods from a predetermined normal, a brake normally biased to stop said rotating means, electrically actuated means for releasing said brake, means for simultaneously energizing said rotating means and said brake releasing means, and means actuated by each of said fault alarms for de-energizing said brake releasing means and said rotating means whereby the location of a faulty coil is indicated by the position of said prods on the commutator of a test armature.

14. Apparatus according to claim 13 including means actuated by said prod mounting means when positioned to remove said prods from the commutator of a test armature for de-energizing said winding.

15. Apparatus according to claim 13 including manually actuated means for energizing said rotating means and said brake release independently of said fault alarms.

16. Apparatus according to claim 15 including means actuated by said armature rotating means for de-energizing said rotating means and said brake releasing means after a test armature has been rotated to a predetermined degree independently of the position of said prod mounting means.

17. Armature testing apparatus comprising electrically energized means for rotating an armature to be tested, means for subjecting an armature so rotated to a magnetic field, a pair of prods mounted to engage the commutator of a test armature in position to establish connection to the opposite ends of each armature coil as the armature rotates, a plurality of fault alarms, means for energizing said fault alarms selectively according to deviations of the voltage between said prods from a predetermined range of values, a brake for stopping said rotating means biased to engaged position, electrically energized means for releasing said brake, each of said fault alarms including means for de-energizing said rotating means and said brake release means when each fault alarm is energized.

18. Apparatus according to claim 17 including means actuated by said armature rotating means for de-energizing said rotating means and said brake releasing means after a test armature has been rotated to a predetermined degree.

19. Apparatus according to claim 18 including means actuated by said armature rotating means for rendering said fault alarms inactive when said rotating means is self-de-energized.

20. Armature testing apparatus comprising means for generating a magnetic field, means for rotating an armature to be tested in said magnetic field, means for establishing electrical connection to the coils of a test armature rotating in said field one by one as each coil is rotated to a predetermined position in said field, means for comparing the level of voltage induced in each coil to a standard reference voltage to produce a difference signal, means for discarding all portions of said difference signal except the portion thereof produced in the middle of the time period during which electrical connection to each coil is established, a plurality of alarm mechanisms, and means for selectively energizing said alarm mechanisms according to the difference between said reference voltage and said induced voltage.

References Cited in the file of this patent

UNITED STATES PATENTS

| Number | Name | Date |
|--------|------|------|
| 2,411,848 | Camras | Dec. 3, 1946 |
| 2,427,672 | Haydock | Sept. 23, 1947 |
| 2,606,231 | Katzman | Aug. 3, 1952 |